US009325077B2

United States Patent
Korsbo et al.

(10) Patent No.: US 9,325,077 B2
(45) Date of Patent: Apr. 26, 2016

(54) RADAR LEVEL GAUGE SYSTEM AND REFLECTOR ARRANGEMENT

(71) Applicant: Rosemount Tank Radar AB, Gothenburg (SE)

(72) Inventors: Thense Korsbo, Lycke (SE); Bjorn Lindblad, Gothenburg (SE)

(73) Assignee: ROSEMOUNT TANK RADAR AB, Gothenburg (SE)

( * ) Notice: Subject to any disclaimer, the term of this patent is extended or adjusted under 35 U.S.C. 154(b) by 249 days.

(21) Appl. No.: 14/077,359

(22) Filed: Nov. 12, 2013

(65) Prior Publication Data

US 2015/0130650 A1 May 14, 2015

(51) Int. Cl.
| | | |
|---|---|---|
| *G01S 13/08* | (2006.01) | |
| *G01F 23/284* | (2006.01) | |
| *G01S 7/40* | (2006.01) | |
| *H01Q 15/14* | (2006.01) | |
| *H01Q 1/22* | (2006.01) | |
| *G01S 13/00* | (2006.01) | |

(Continued)

(52) U.S. Cl.
CPC .............. *H01Q 15/14* (2013.01); *G01F 23/284* (2013.01); *H01Q 1/225* (2013.01)

(58) Field of Classification Search
CPC ....... G01F 23/22; G01F 23/28; G01F 23/284; G01F 23/296; G01F 23/2962; H01Q 1/12; H01Q 1/22; H01Q 1/225; H01Q 15/14; G01S 13/02; G01S 13/50; G01S 13/58; G01S 13/581; G01S 13/582; G01S 7/02; G01S 7/40

USPC ................. 342/5–11, 22, 118, 124, 165–175, 342/192–197; 73/290 R, 290 V; 343/700 R, 343/907, 912, 915

See application file for complete search history.

(56) References Cited

U.S. PATENT DOCUMENTS

| | | | | |
|---|---|---|---|---|
| 4,210,023 A | * | 7/1980 | Sakamoto | ............. G01F 23/284 342/124 |
| 4,641,139 A | * | 2/1987 | Edvardsson | .......... G01F 23/284 342/124 |
| 5,095,748 A | | 3/1992 | Gregory et al. | |

(Continued)

FOREIGN PATENT DOCUMENTS

| | | |
|---|---|---|
| EP | 2 199 763 A1 | 6/2010 |
| GB | 141 850 | 4/1920 |
| WO | WO 2015/000816 | 1/2015 |

OTHER PUBLICATIONS

"Inspection Techniques: Nonsparking Tools", URL: http://www.usfa.fema.gov/downloads/pdf/coffeebreak/cd_fp_2013_15.pdf, Apr. 9, 2013.

(Continued)

*Primary Examiner* — Bernarr Gregory
(74) *Attorney, Agent, or Firm* — Westman, Champlin & Koehler, P.A.

(57) ABSTRACT

The present invention relates to reflector arrangement for proof test of a radar level gauge and to a radar level gauge system comprising such a reflector arrangement. The reflector arrangement comprises a pliable elongated member for attachment to a fixed structure in the tank; a weight attachable to the pliable elongated member; and a reflector member for reflecting an electromagnetic signal impinging on the reflector plate. The weight is configured to be coupled to the reflector member in such a way that an orientation of the weight determines an orientation of the reflector member.

40 Claims, 9 Drawing Sheets

(51) Int. Cl.
*G01F 23/00* (2006.01)
*G01S 7/00* (2006.01)

(56) References Cited

U.S. PATENT DOCUMENTS

| | | | | |
|---|---|---|---|---|
| 5,357,801 | A * | 10/1994 | Sinclair | G01F 23/2962 |
| | | | | 181/124 |
| 5,629,706 | A * | 5/1997 | Bååth | G01F 23/284 |
| | | | | 342/124 |
| 6,492,933 | B1 * | 12/2002 | McEwan | G01S 13/582 |
| | | | | 342/124 |
| 6,759,977 | B1 * | 7/2004 | Edvardsson | G01F 23/284 |
| | | | | 342/124 |
| 6,795,015 | B2 * | 9/2004 | Edvardsson | G01F 23/284 |
| | | | | 342/124 |
| 7,088,285 | B2 * | 8/2006 | Smith | G01F 23/284 |
| | | | | 342/124 |
| 7,486,226 | B2 * | 2/2009 | Edvardsson | G01F 23/284 |
| | | | | 342/124 |
| 7,525,476 | B1 * | 4/2009 | Delin | G01F 23/284 |
| | | | | 342/124 |
| 7,532,155 | B2 * | 5/2009 | Kleman | G01F 23/284 |
| | | | | 342/124 |
| 7,586,435 | B1 * | 9/2009 | Edvardsson | G01F 23/284 |
| | | | | 342/124 |
| 7,891,229 | B2 * | 2/2011 | Sai | G01F 23/284 |
| | | | | 73/290 V |
| 8,009,085 | B2 * | 8/2011 | Kuhlow | G01F 23/284 |
| | | | | 342/124 |
| 8,018,373 | B2 * | 9/2011 | Edvardsson | G01F 23/284 |
| | | | | 342/124 |
| 8,350,752 | B2 * | 1/2013 | Hemmendorff | G01F 23/284 |
| | | | | 342/124 |
| 8,830,118 | B2 * | 9/2014 | Wennerberg | G01F 23/284 |
| | | | | 342/124 |
| 9,024,807 | B2 * | 5/2015 | Widahl | G01F 23/284 |
| | | | | 342/124 |

OTHER PUBLICATIONS

"Secchi Disk and Viewscope Tips", Carlson et al., URL: http://www.secchidipin.org/makedisk.htm, Jan. 1, 2009.
"Volunteer Estuary Monitoring a Methods Manual Second Edition", Ohrel et al., The Oean Conservancy and U.S.: Environmental Protection Agency, Office of Wetlands, Washington, D.C., Mar. 31, 2006.
"Calibration and Accuracy of Radar Level Gauges", Edvardsson, Advances in Instrumentation and Control, vol. 47, No. Part 2, Jan. 1, 1992.
Notification of Transmitter of the International Search Report and the Written Opinion of the International Searching Authority, PCT/EP2014/073606, dated Apr. 1, 2015.

* cited by examiner

RADAR LEVEL GAUGE SYSTEM AND REFLECTOR ARRANGEMENT

TECHNICAL FIELD OF THE INVENTION

The present invention relates to a radar level gauge, a reflector arrangement, a method of installing a reference reflector, and a method of testing a radar level gauge.

TECHNICAL BACKGROUND

Radar level gauges are in wide use for measuring the filling level of a product contained in a tank. Radar level gauging is generally performed by propagating an electromagnetic transmit signal towards the product contained in the tank, and receiving an electromagnetic surface reflection signal resulting from reflection of the transmit signal at the surface of the product.

The transmitted electromagnetic signal may be radiated towards the product contained in the tank, or may be guided towards and into the product by a transmission line probe. The latter is often referred to as Guided Wave Radar (GWR).

Based on the transmit signal and the surface reflection signal, the distance to the surface of the product can be determined. The filling level can be deduced from this distance.

Radar level gauges are often classified as either pulsed systems or FMCW-systems. In pulsed systems, pulses are transmitted towards the surface of the product, and the distance to the surface is determined based on the time-of-flight of the pulse to the surface and back to the radar level gauge. In FMCW-systems, a signal with a time-varying frequency is transmitted towards the surface and the distance is determined based on the frequency (and/or phase) difference between a transmitted signal and a simultaneously received signal. So-called pulsed FMCW-systems also exist.

Radar level gauges are in some cases used for applications where malfunction of the radar level gauge could result in dangerous situations.

For example, a radar level gauge with overfill prevention functionality must be extremely reliable.

Various measures are taken to ensure the reliability of radar level gauges, in particular radar level gauges with overfill prevention functionality, and to thereby reduce the risk of dangerous situations, such as overfill. For instance, radar level gauges and other important devices may be designed to fulfill a certain Safety Integrity Level (SIL) as defined by the international standard IEC/EN 61508. According to this standard, safety related systems may fulfill the requirements for different Safety Integrity Levels from $SIL_1$ to $SIL_4$, where $SIL_4$ represents the highest safety integrity level and $SIL_1$ represents the lowest safety integrity level.

The SIL-rating of a system is related to the probability of failure on demand, which is in turn a function of the failure rate and the time between proof tests. To maintain a certain SIL-rating, it is thus necessary to perform proof tests at a regular interval specified in accordance with the SIL-rating. For example, proof tests may need to be performed annually.

Proof tests are generally specified by the manufacturer of the SIL-rated system and it is the responsibility of the user of the system that the proof tests are carried out properly.

SUMMARY

In view of the above-mentioned and other drawbacks of the prior art, a general object of the present invention is to provide for improved proof testing of a radar level gauge system.

According to a first aspect of the present invention, it is therefore provided a radar level gauge system for determining a filling level of a product in a tank, the radar level gauge system comprising: a transceiver for generating, transmitting and receiving electromagnetic signals; a signal propagation arrangement connected to the transceiver and arranged to propagate an electromagnetic transmit signal from the transceiver towards the product in the tank, and to return to the transceiver an electromagnetic surface reflection signal resulting from reflection of the electromagnetic transmit signal at a surface of the product; a reflector arrangement comprising: a pliable elongated member attached at an attachment location within the tank; a reflector member arranged along the pliable elongated member and spaced apart from the attachment location; and a weight coupled to the reflector member in such a way that an orientation of the weight determines an orientation of the reflector member, wherein the reflector member is arranged to reflect the electromagnetic transmit signal back towards the transceiver as an electromagnetic reflector signal; and processing circuitry coupled to the transceiver and configured to determine a proof test level based on the transmit signal and the reflector signal.

The tank may be any container or vessel capable of containing a product, and may be metallic, or partly or completely non-metallic, open, semi-open, or closed.

The "transceiver" may be one functional unit capable of transmitting and receiving electromagnetic signals, or may be a system comprising separate transmitter and receiver units.

The processing circuitry may be provided as separate devices, or as a single device, and may be realized through hardware, software or a combination thereof.

The signal propagation arrangement may be any arrangement capable of propagating the electromagnetic transmit signal. For example, the signal propagation arrangement may comprise an antenna or a transmission line probe.

In any case, the signal propagation arrangement can be said to propagate the electromagnetic transmit signal according to a "propagation pattern", which should be understood as the distribution of the propagated energy from the propagation arrangement. An example of the propagation pattern of a propagation arrangement is the "antenna lobe" of a radiating antenna. Also in the case of the signal propagation arrangement comprising a transmission line probe, the microwaves guided by the transmission line probe may extend outside the probe with an energy density decreasing with increasing distance from the transmission line probe.

Since the elongated member of the reflector arrangement is pliable (easily bendable), its general extension within the tank will typically be determined by the force of gravity acting upon the weight. Accordingly, the pliable elongated member may typically extend vertically within the tank.

The reflector member may have a first maximum extension in a reflector plane, and the weight may have a second maximum extension, smaller than said first maximum extension, in a plane parallel to the reflector plane.

The reflector member may generally extend substantially horizontally, that is, have a substantially greater horizontal extension than vertical extension.

The reflector member of the reflector arrangement may be located at least partly within the propagation pattern of the signal propagating device.

The pliable elongated member may be a wire, which may be metallic or non-metallic. Moreover, such a wire may comprise a single filament or a plurality of filaments. Alternatively, the pliable elongated member may be provided in any other form, such as in the form of a woven band.

In the following, the term "wire" is generally used rather than the term "pliable elongated member". This should by no means be construed as limiting the scope of the present invention.

It should be understood that the reflector member need not necessarily be formed by a (machined) plate, but that it may, for example, alternatively be formed by a plurality of pins and/or a plurality of plates.

The present invention is based on the realization that the repeatability and reliability of the testing of a radar level gauge system can be improved by providing a reflector arrangement comprising a wire or another pliable elongated member with a weight hanging in the wire and a reflector member coupled to the wire. The weight will keep the wire vertical, at least locally. Since the reflector member is coupled to the weight, this in turn allows for a repeatable and robust arrangement of the reflector member.

For example, the reflector member may be horizontally arranged. In this case, the reflector member may be coupled to the weight in such a way that the reflector member is perpendicular to the extension direction of the weight.

Accordingly, various embodiments of the present invention provide for reliable proof testing of the radar level gauge system, since the orientation of the reflector member will be self-adjusted through the action of gravity on the weight.

Furthermore, various embodiments of the present invention provide for a relatively simple installation and/or a reduced risk for installation errors.

The reflector arrangement may further advantageously be configured in such a way that the reflector member is arranged at a known level above the overfill alarm level for the tank.

Moreover, the wire may advantageously pass through the center of mass of the reflector member and through the center of mass of the weight.

The reflector member may advantageously have a lateral dimension, such as a diameter in the case of a disc-shaped reflector plate, that is substantially larger than the lateral dimension, such as diameter, of the weight. For instance, the (largest) lateral dimension of the reflector member may be at least twice the largest lateral dimension of the weight. Preferably, the (largest) lateral dimension of the reflector member may be at least three times the largest lateral dimension of the weight.

Moreover, the vertical dimension (the length) of the weight may be substantially greater than the thickness of the reflector member. For instance, the length of the weight may be at least four times the thickness of the reflector member.

According to various embodiments, the weight and the reflector member may be coupled to each other using at least one releasable fastener, such as a bolt and/or a nut.

Alternatively, the weight and the reflector member may be different portions of an integral reflector assembly. Such an integral reflector assembly may be formed from a single piece of material or may be formed from two or more pieces that have been joined together through, for instance, welding.

According to various embodiments, furthermore, the reflector member may advantageously be arranged between the weight and the attachment location. In other words, the weight may be arranged below the reflector member. In embodiments where the configuration inside the tank is such that the attachment location is not directly above the intended position of the reflector member, the wire may be required to bend somewhere above the reflector member. For instance, the reflector member may abut against a structure inside the tank, and the provision of the weight below the reflector member may then lead to bending of the wire in such a way that the reflector member becomes arranged as intended.

The properties, such as density and dimensions, of the weight should be such that the weight provides a sufficient torque to bend the wire and thereby reorient the reflector member if necessary. How much torque is required will depend on various factors, such as the particular installation, the properties of the wire (how easy it is to bend) and the dimensions of the reflector member. It will be straight forward for the skilled person to determine suitable dimensions of the weight through simple calculations and/or limited trial-and-error testing.

In many cases, it may be beneficial if the weight extends along the wire along a distance being greater than one half of a maximum reflector member extension in a direction perpendicular to the wire.

According to various embodiments, the weight may have an internal surface enclosing the wire, and the reflector arrangement may further comprise at least one releasable weight fastener arranged for pressing the wire against the internal surface of the weight.

This is a convenient way of attaching the weight to the wire and also allows for some adjustment of the vertical position of the reflector member by releasing the weight fastener, moving the weight and then refastening the fastener.

In various embodiments of the radar level gauge according to the present invention, the reflector arrangement may advantageously be attached to the signal propagation arrangement.

To allow for simple attachment of the reflector arrangement to the signal propagation arrangement, the reflector arrangement may advantageously further comprise a clamping member clamped to the signal propagation arrangement. The clamping member provides for a simple upgrade of existing radar level gauge systems.

In embodiments where the signal propagating arrangement comprises a radiation directing member having a periphery, the clamping member of the reflector arrangement may advantageously extend around the periphery of the radiation directing member.

If, for instance, the radiation directing member is the reflector of a parabolic antenna, the clamping device may extend along a rim of the reflector.

If the radiation directing member is an antenna horn, the clamping device may extend along a rim of the antenna horn.

According to various embodiments, the reflector plate may be perforated, in order to facilitate drip off of product that may have come into contact with the reflector plate, for example through splashing. The dimensions and/or positioning of the holes through the perforated plate may be selected to match the frequency of the electromagnetic signals used. In embodiments where the electromagnetic transmit signal is a modulated carrier having a carrier frequency, the holes through the perforated reflector plate may be as big as possible while still reflecting microwaves at the carrier frequency.

In embodiments where the propagation arrangement is configured such that the electromagnetic signals are radiated towards the product in the tank using a directional antenna, the propagation pattern (or antenna lobe) may generally defined by an angle.

For the reflector member to be located within the propagation pattern, it may therefore be advantageous to provide differently sized reflector members for different vertical positions of the reflector member. A shorter vertical distance from the attachment location to the reflector member will require a reflector member with a larger horizontal extension than a longer vertical distance from the attachment location to the reflector member.

In other embodiments, the signal propagation arrangement may comprise a pipe extending vertically in the tank, and an antenna arranged at a top opening of the pipe; and the wire may be attached to the pipe. This type of vertically extending pipe is often referred to as a still pipe.

In these embodiments, the attachment location may advantageously be adjacent to the wall of the pipe, in order to minimize any reflection caused by the attachment location close to the top end of the pipe.

The reflector member may, however, advantageously have at least a reflective surface portion arranged at the center of the pipe in order to provide a suitable echo. This is particularly the case when the low-loss propagation mode TE01 is used, since the microwave power has its maximum at the center of the pipe.

Accordingly, in various embodiments, the wire may not extend vertically from the attachment location to the reflector member, but the distance from the inner wall of the pipe to the wire may gradually increase from the attachment location to the reflector member. The reflector member will rest on the inner wall of the pipe at a point of contact, and the wire will be curved about this point of contact through the torque acting on the wire due to the weight arranged below the reflector member.

Through the provision of the weight below the reflector member, it is thus possible to simultaneously achieve the arrangement of the attachment location close to the inner wall of the pipe, a gradual increase of the distance between the inner wall and the wire, and a horizontal reflector member at the longitudinal axis of the pipe.

To provide for convenient attachment of the wire of the reflector arrangement at the attachment location close to the inner wall of the pipe, the reflector arrangement may advantageously comprise a clamping member inserted in the pipe through the top opening.

The outer diameter of still pipes may be specified and standardized according to a so-called schedule. However, the wall thickness may vary from installation to installation. This means that the inner diameter may vary from installation to installation. To conveniently handle this, the clamping member may advantageously have an adjustable diameter.

According to embodiments, the clamping member may be provided as an adjustable inner sleeve for the pipe, where the inner sleeve may have a radially extending portion for resting on the top end surface of the sleeve.

Furthermore, the reflector arrangement may comprise an attachment member attached to the wire, a diameter of the attachment member being greater than a diameter of the wire; and the clamping member may comprise a receiving member for interacting with the attachment member to attach the reflector arrangement to the clamping member.

For instance, this receiving member may be provided in the form of a radially projecting support with a hole formed therein. The hole may advantageously be open from the side to allow simple insertion of the wire. Such a side opening may be sufficiently big to allow insertion from of the wire the side, and sufficiently small to prevent the receiving member from passing through the side opening. In this manner, simple insertion can be combined with secure insertion reducing the risk of dropping the reflector arrangement into the pipe upon installation or removal.

To further reduce the risk of installation failure, the reflector arrangement may further comprise an additional wire attachable to the attachment member. This additional wire may be temporarily attached to a fixed structure inside or outside the tank before the reflector arrangement is inserted into the pipe. Hereby, the reflector arrangement can easily be retrieved in the event that it should be dropped into the pipe.

According to various embodiments of the present invention, the reflector member may be configured to facilitate manual measurement of the filling level in the tank through the pipe, for instance through so-called hand dipping. To that end, the reflector member may have a few openings corresponding to at least half of the total surface area of a circle inscribing the reflector member. Advantageously, the reflector member may have five or fewer openings.

For example, the reflector member may comprise a central portion, a peripheral portion and at least two arms connecting the central portion and the peripheral portion.

To reduce the risk of sparking when the reflector arrangement is installed in or removed from the tank, the reflector arrangement may at least partly be made of a non-sparking material, such as bronze or brass or similar materials.

In embodiments where the radar level gauge system is controllable between a filling level measuring state and a proof test state, the reflector arrangement may advantageously be arranged and configured substantially identically in the filling level measuring state and in the proof test state.

Moreover, the radar level gauge according to various embodiments of the present invention may advantageously be comprised in a filling level measuring system, further comprising a host system receiving measurement signals from the radar level gauge.

For an analog output interface in the radar level gauge system, the filling level can be communicated as a current between 4 mA and 20 mA. The high level alarm limit may correspond to a current within this range. Alternatively, the high level alarm limit may be set at the radar level gauge, which may then be configured to communicate an overfill condition with an alarm current, for instance 21.75 mA (a current outside the 4 to 20 mA range).

In many field applications, there is provided a digital communication link. This will provide possibilities of communicating several indications for a present operational condition. For instance, an alarm and a determined filling level could be communicated independently of each other.

According to various embodiments, the filling level measurement may further comprise an additional filling level measuring device arranged to measure the filling level of the product in the tank.

According to a second aspect of the present invention, it is provided a reflector arrangement for proof test of a radar level gauge, the reflector arrangement comprising: a wire for attachment to a fixed structure in the tank; a weight attachable to the wire; and a reflector member for reflecting an electromagnetic signal impinging on the reflector member.

In various embodiments, the reflector arrangement may comprise a plurality of discs with different diameters.

Embodiments of, and effects obtained through this second aspect of the present invention are largely analogous to those described above for the first aspect of the invention.

According to a third aspect of the present invention, it is provided a method of installing a reference reflector for testing a radar level gauge arranged at a tank, the method comprising the steps of: providing a reflector arrangement comprising: a pliable elongated member; a reflector member; and a weight coupled to the reflector member in such a way that an orientation of the weight determines an orientation of the reflector member; attaching the pliable elongated member at an attachment location within the tank; and lowering the reflector member and the weight into the tank through an opening in a roof of the tank.

According to a fourth aspect of the present invention, it is provided a method of testing a radar level gauge arranged at a tank containing a product, the method comprising the steps of: providing a reflector arrangement comprising: a pliable elongated member; a reflector member; and a weight coupled to the reflector member in such a way that an orientation of the weight determines an orientation of the reflector member; attaching the pliable elongated member at an attachment location within the tank; arranging the reflector member at a known proof test level; transmitting an electromagnetic transmit signal towards a surface of the product; receiving an electromagnetic reflector signal resulting from reflection of the electromagnetic transmit signal at the reflector member; and determining a proof test level based on the transmit signal and the reflector signal.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF EXAMPLE EMBODIMENTS OF THE INVENTION

In the present detailed description, various embodiments of the radar level gauge system and reflector arrangement according to aspects of the present invention are mainly discussed with reference to a reflector arrangement comprising a reflector plate attached to a weight by means of a releasable fastener.

It should be noted that this by no means limits the scope of the present invention, which equally well includes, for example, other types of reflector members, as well as embodiments where the reflector member is not attached to the weight or is attached to the weight using another kind of fastener. For instance, the reflector member may be provided in the form of one or several pins attached to the weight.

Figure 1:
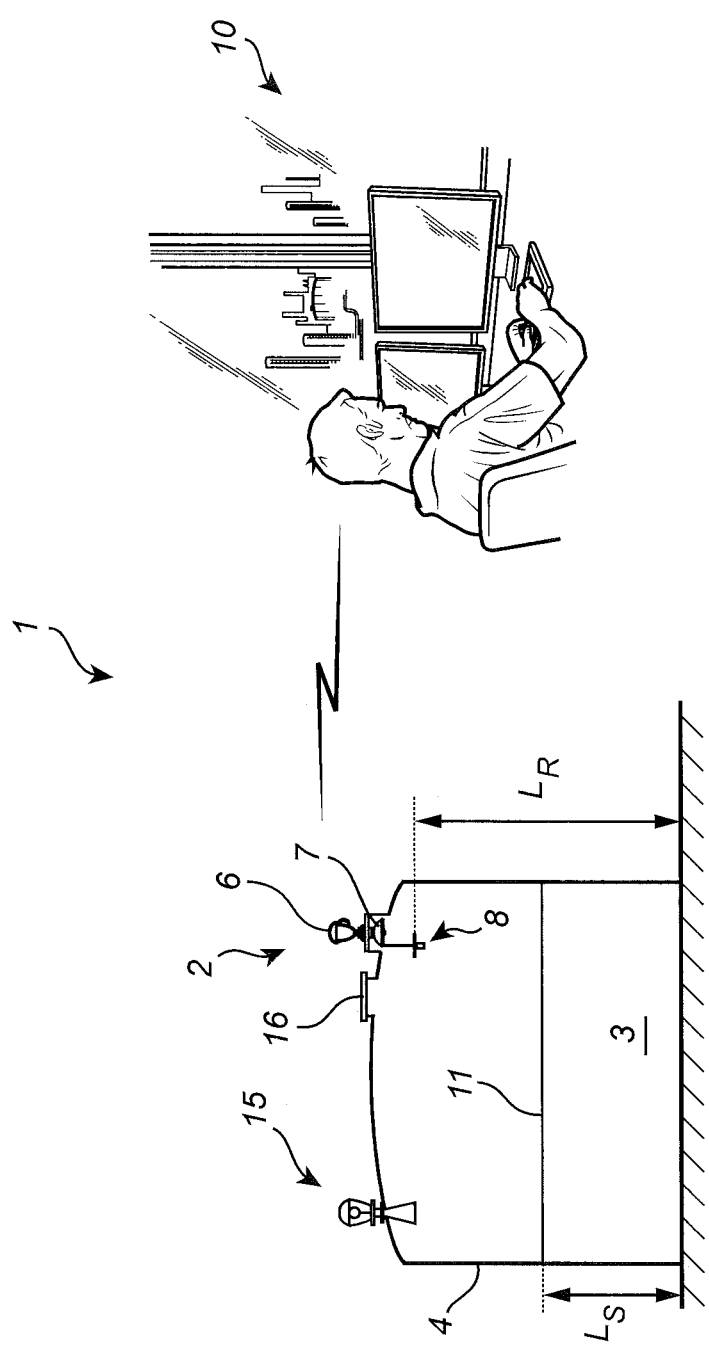
FIG. 1 schematically shows a filling level measuring system comprising a radar level gauge system according to a first embodiment of the present invention, and a host system.

FIG. 1 schematically shows a level measuring system 1 comprising a radar level gauge system 2 according to a first embodiment of the present invention and a host system 10 illustrated as a control room.

The radar level gauge system 2 is installed to measure the filling level of a product 3 contained in a tank 4. The radar level gauge system 2 comprises a measuring unit 6, a propagation arrangement in the form of a parabolic antenna 7, and a reflector arrangement 8. The measurement unit 6 comprises (not shown in FIG. 1) a transceiver, processing circuitry and a communication interface.

The reflector arrangement 8, which will be described in greater detail below with reference to FIG. 2 and FIGS. 3a, 3b, and 3c comprises a reflector plate arranged at a reflector level $L_R$, which may advantageously correspond to an overfill warning level for the tank 4.

The transceiver is configured to generate, transmit and receive electromagnetic signals, the processing circuitry is connected to the transceiver and configured to determine the filling level $L_S$ of the product 3 based on a received electromagnetic signal being a reflection of the transmitted signal at the surface 11 of the product 3, and the communication interface is connected to the processing circuitry and configured to allow communicating with the host system 10. In the example embodiment of FIG. 1, the communication between the radar level gauge 2 and the host system 10 is indicated as being wireless communication. Alternatively, communication may, for example, take place over an analog and/or digital wire-based communication channel. For instance, the communication channel may be a two-wire 4-20 mA loop and the filling level may be communicated by providing a certain current corresponding to the filling level on the two-wire 4-20 mA loop. Digital data may also be sent across such a 4-20 mA loop, using the HART protocol. Furthermore, pure digital communication protocols such as Modbus or Foundation Fieldbus may be used.

As can be seen in FIG. 1, the tank 4 is equipped with an additional radar level gauge system 15 which may be used for determining the filling level $L_S$. It would also be possible to use a so-called 2-in-1 solution if the radar level gauge system 2 includes two separated measurement channels, effectively making it two radar level gauges sharing the same antenna 7.

In addition, the tank 4 comprises an inspection hatch 16 allowing access to the inside of the tank 4 for enabling, for example, hand dipping for manually determining the filling level $L_S$.

The radar level gauge system 2 in FIG. 1 is configured to allow the operator of the filling level measuring system 1 to carry out reliable proof tests of the radar level gauge 2 itself as well as of the filling level measuring system 1 as a whole.

The radar level gauge system 2 in FIG. 1, and in particular the reflector arrangement 8 comprised in the radar level gauge system 2, will now be described with reference to FIG. 2.

Figure 2:
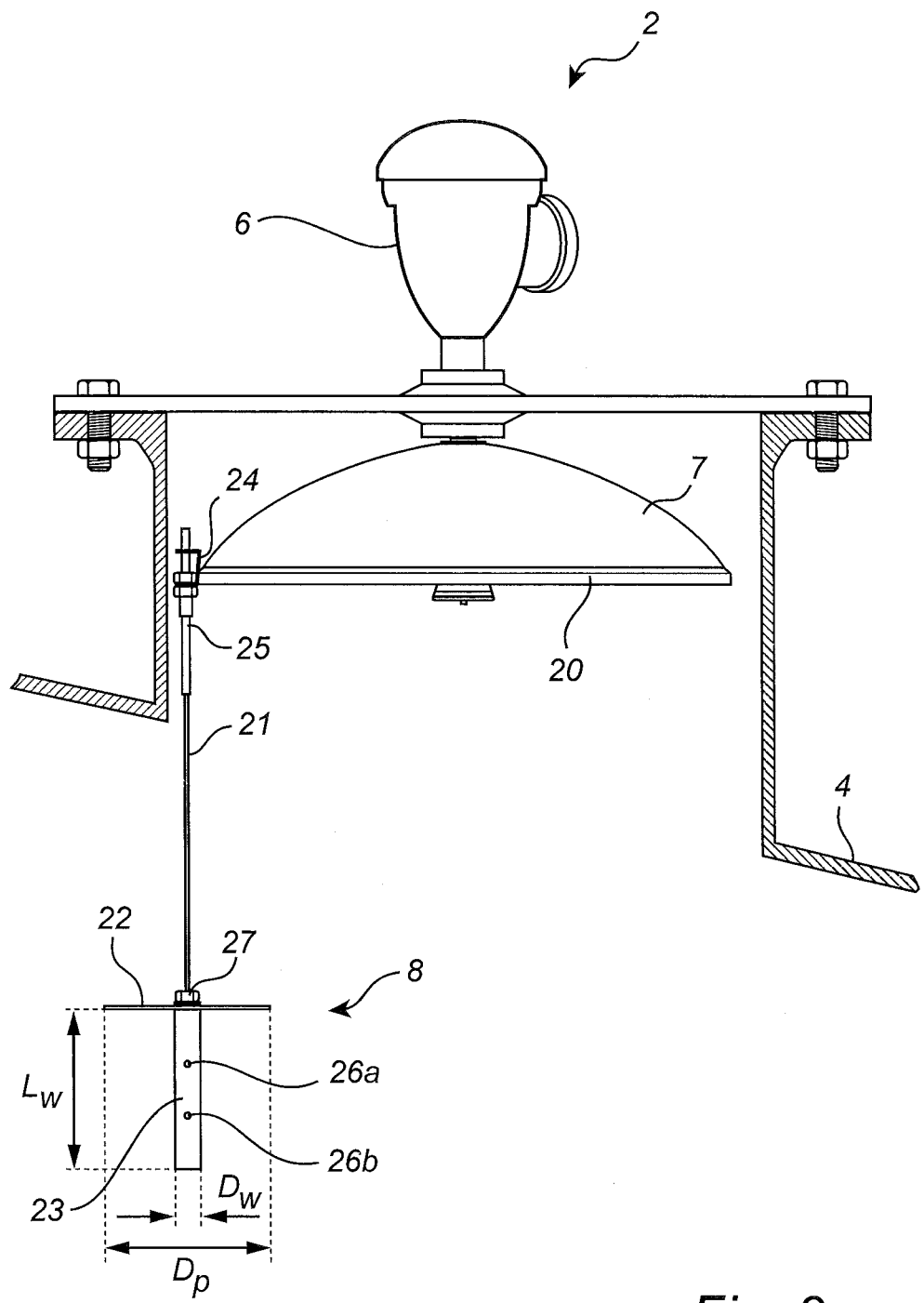
FIG. 2 is an enlarged view of the radar level gauge system in FIG. 1.

As can be seen in FIG. 2, the reflector arrangement 8 comprises a clamping member 20, a pliable metal wire 21, a reflector plate 22 and a weight 23.

The clamping member 20 is clamped around the rim of the parabolic antenna 7 and comprises a fixture 24 providing an attachment location for attachment of the pliable wire 21 to the parabolic antenna 7.

The wire 21 is attached to the clamping member 20 via an attachment member, here in the form of a brass rod 25, that is fixed to the wire 21.

The weight 23 is attached to the end of the wire 21 using weight fasteners 26a-b pressing the wire 21 against an internal surface of the weight 23. The reflector plate 22 is in turn connected to the upper surface of the weight 23 by means of a releasable fastener, here in the form of a nut 27.

The weight 23, which is substantially cylindrical, extends along the wire along a distance $L_w$ that is greater than half the lateral dimension (here diameter $D_p$) of the reflector plate 22. The weight 23 will make the wire 21 extend vertically from the attachment location, and it will also automatically align the reflector plate 22 to present a horizontal reflection surface to the antenna 7. By suitably dimensioning the weight 23 in relation to the wire 21 and the reflector plate 22, the weight 23 can keep the reflector plate 22 horizontal even if the properties of the reflector plate 22 should be changed, for example due to asymmetrical product contamination or for other reasons.

Since the weight 23 and the reflector plate 22 are connected in such a way that the reflector plate 22 is pressed against the upper surface of the weight 23, the orientation of the weight 23 will decide the orientation of the reflector plate 22. The most relevant design parameters for ensuring that the weight 23 will be controlling the orientation of the reflector structure formed by the weight 23 and the reflector plate 22 are the mass of the weight 23 and the distance from the reflector plate 22 to the center of mass of the weight 23.

As can be seen in FIG. 2, the lateral dimension (diameter) $D_w$ of the weight 23 is substantially smaller than the lateral dimension $D_p$ of the reflector plate 22. For example, the $D_w$ may be less than one half of $D_p$.

In a radar level gauge system that radiates the transmit signal towards the surface 11 of the product 3 in the tank 4 through free space, the propagation pattern will typically be formed by an antenna lobe that diverges with increasing distance from the antenna 7. An example divergence may be about 5° in relation to the vertical. Since the weight 23 makes the wire 21 of the antenna arrangement 8 extend vertically, this means that a reflector plate 22 of a given lateral dimension $D_p$ will interact differently with the propagation pattern from the antenna 7 for different vertical distances along the wire 21 from the antenna 7.

Figure 3:
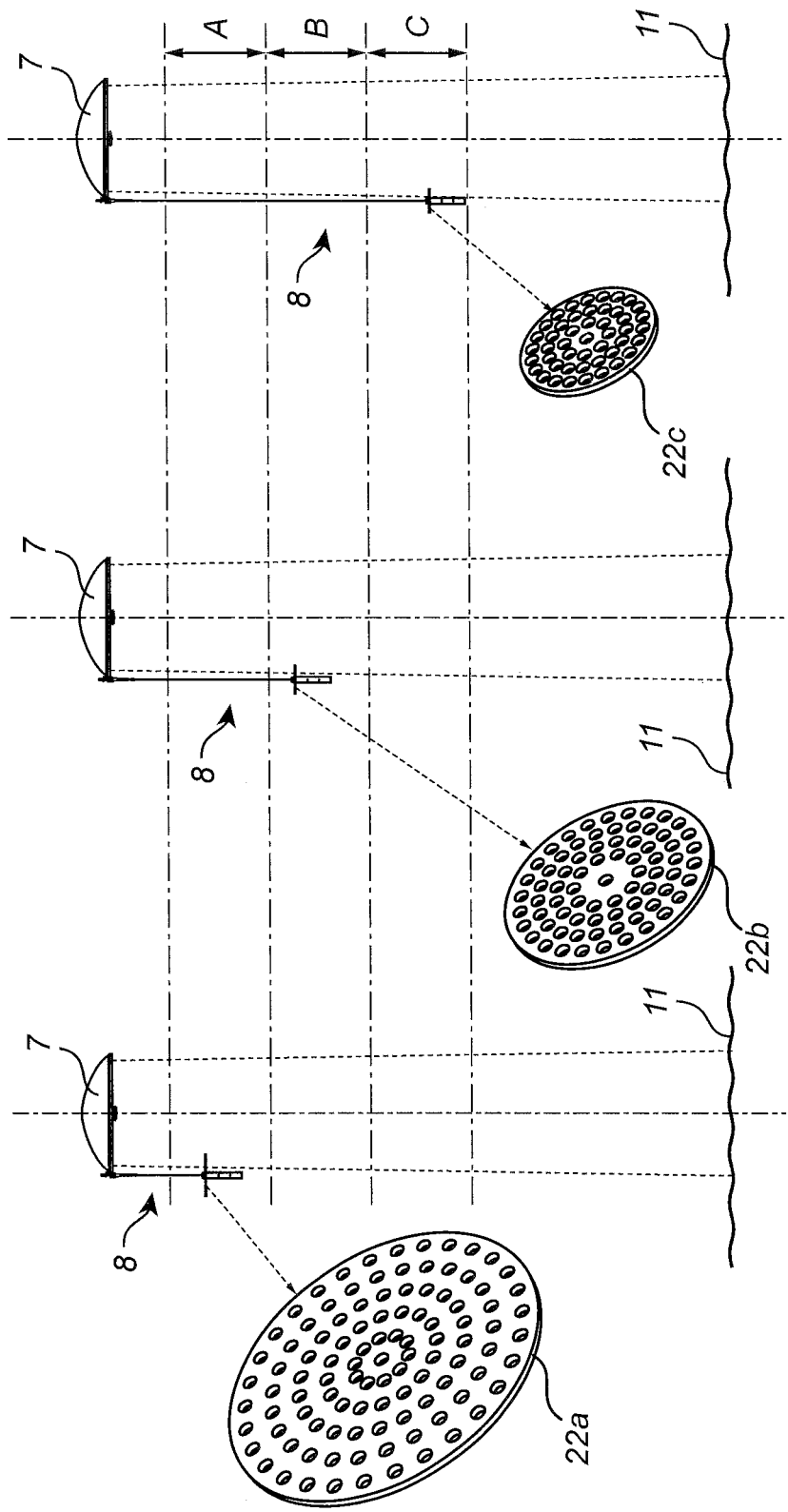
FIGS. 3a, 3b, and 3c schematically illustrate the use of different reflector plates for different vertical positions in the tank.

This phenomenon is schematically illustrated in FIGS. 3a-b showing three different reflector arrangement configurations with different vertical distances between the attachment location at the rim of the antenna 7 and the reflector plate 22. The propagation pattern is schematically indicated using slightly inclined dashed lines in FIGS. 3a-c.

In this embodiment, in order to provide for a suitable reflector signal for different vertical distances, the reflector arrangement 8 is provided in the form of a kit of parts with three different reflector plates 22a-c with different diameters, where each reflector plate should be used for installation within a respective vertical distance interval. Alternatively, the reflector plate 22 may be configured such that the lateral dimension thereof is adjustable, for example by means of slidable or foldable parts.

As an illustrative example, installation instructions may be provided according to the following table.

| vertical distance interval (m) | reflector plate diameter (mm) |
|---|---|
| A: 1.0 ≤ dist < 2.5 | 200 |
| B: 2.5 ≤ dist < 3.8 | 135 |
| C: 3.8 ≤ dist ≤ 5.0 | 90 |

A filling level measuring system 1 comprising a radar level gauge system 30 according to a second embodiment of the present invention will now be described with reference to FIG. 4. The filling level measuring system 1 shown in FIG. 4 differs from that described above with reference to FIG. 1 in that the radar level gauge 30 in FIG. 4 is mounted at the top end of a still pipe 33 that is installed in the tank 4.

Figure 4:
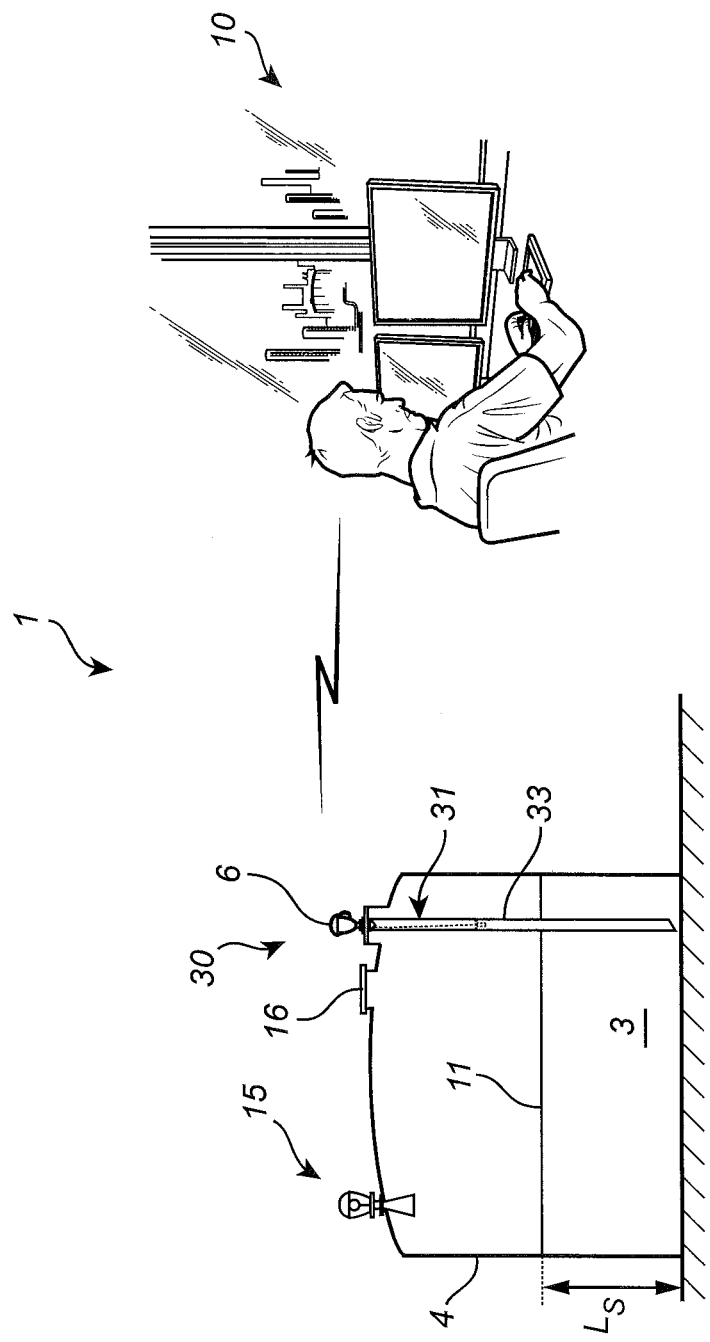
FIG. 4 schematically shows a filling level measuring system comprising a radar level gauge system according to a second embodiment of the present invention, and a host system.

As is indicated in FIG. 4, the radar level gauge system 30 comprises a reflector arrangement 31, which will be described in further detail below with reference to FIG. 5, which is a schematic perspective view of the radar level gauge system 30 in FIG. 4.

The radar level gauge system 30 comprises a measurement unit 6, a signal propagation arrangement comprising the antenna 7, which is here provided in the form of an array antenna protected by a conical radome, and the still pipe 33, and the reflector arrangement 31.

Figure 5:
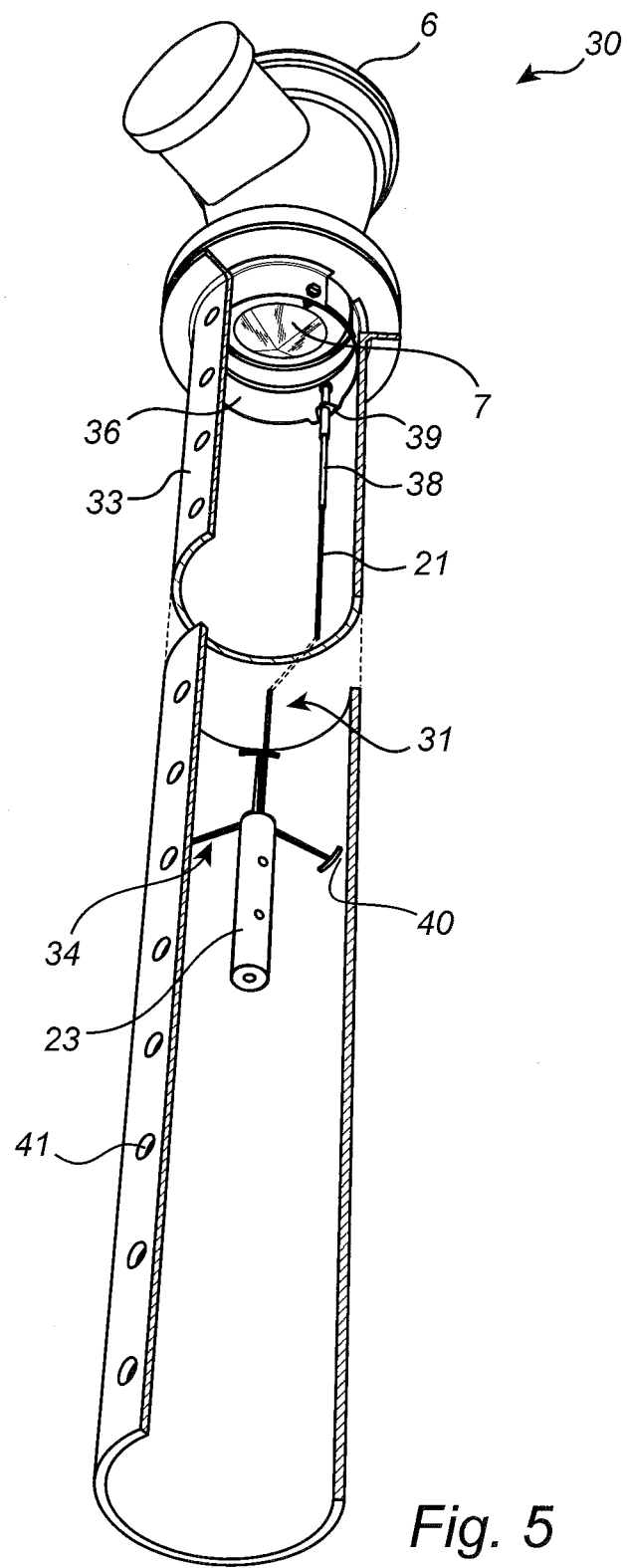
FIG. 5 is an enlarged view of the radar level gauge system in FIG. 4.

Analogously to the reflector arrangement 8 described above with reference to FIG. 2, the reflector arrangement 31 in FIG. 5 comprises a clamping member 36 interacting with the antenna arrangement, a pliable wire 21, a weight 23 attached to the wire 21, and a reflector plate 34 connected to the weight 23.

As will be described in further detail below, the reflector arrangement 31 comprises an attachment member 38, here in the form of a bronze rod, attached to the wire 21, and the clamping member 36 comprises a receiving member 39 for interacting with the attachment member to attach the remainder of the reflector arrangement 31 to the clamping member 36.

As can be seen in FIG. 5, the attachment location, defined by the receiving member 39, is arranged adjacent to the inner wall of the still pipe 33 in order not to unnecessarily disturb the transmit signal radiated by the antenna 7.

However, as is also indicated in FIG. 5, the center of the reflector plate 34 is arranged at or close to the center of the still pipe 33. This means that the wire 21, in this embodiment, does not extend vertically from the attachment location to the reflector plate 34.

To keep the reflector plate 34 horizontal, the wire 21 is, by means of the torque provided by the weight 23, slightly bent about a point of contact 40 between the reflector plate 34 and the inner surface of the still pipe 33.

As is also indicated in FIG. 5, the still pipe 33 has a plurality of holes 41 for allowing fluid communication between the inside and the outside of the still pipe 33. As will be described in more detail further below, various embodiments of the reflector plate 34 exhibit a peripheral portion being larger than the lateral dimension of the holes 41, so that the holes 41 will not interfere with the reflector plate 34 (so that the reflector plate 34 will not get stuck in the holes 41).

Various parts of the reflector arrangement 31 in FIG. 5 will now be described with reference to FIG. 6, FIG. 7 and FIGS. 8a-b.

Figure 6:
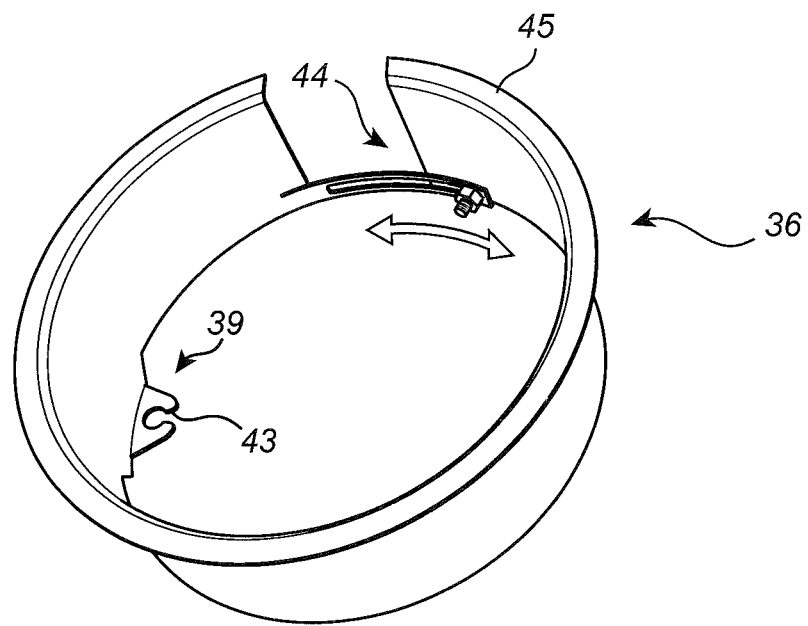
FIG. 6 is a perspective view of the clamping member comprised in the reflector arrangement of the radar level gauge system in FIG. 5.

FIG. 6 schematically shows the clamping member 36 comprised in the reflector arrangement 31. As was mentioned above, the clamping member comprises a receiving member in the form of an open ring, where the opening 43 is larger than the diameter of the wire 21 but smaller than the diameter of the bronze rod 38 at the top end of the wire 21.

As is schematically indicated in FIG. 6, the clamping member 36 further comprises an adjustment arrangement 44 and a radially extending portion, here provided as a flange 45. Through the adjustment arrangement, the diameter of the clamping member 36 can be adjusted so that it can accommodate still pipes having different inner diameters, and the flange 45 is configured to rest on the top end of the still pipe 33 to define a vertical distance between the top end of the still pipe 33 and the attachment location for the wire 21.

Figure 7:
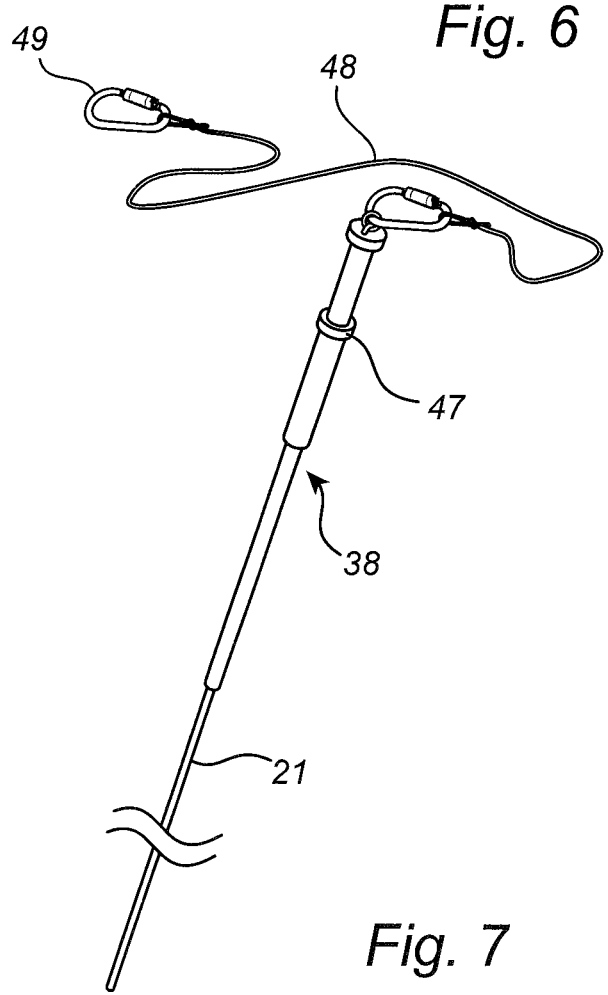
FIG. 7 is a perspective view of the wire comprised in the reflector arrangement of the radar level gauge system in FIG. 5.

FIG. 7 schematically shows the top end of the wire 21 comprised in the reflector arrangement 31 and the attachment member 38 connected to the wire 21.

The attachment member 38 is provided with an annular ledge 47 having a larger diameter than the hole in the receiving member 39 of the clamping member 36 (see FIG. 6), so that the annular ledge 47 rests on the receiving member 39 when the wire 21 hangs from the clamping member 36.

There is additionally provided a safety wire 48 attached to the top end of the attachment member 38 and having a carabiner 49 at the end thereof for temporary attachment to the tank 4 during installation of the reflector arrangement 31.

Two exemplary reflector plates 34a-b that may advantageously be used in a still pipe 33 will now be described with reference to FIGS. 8a-b.

Figure 8A:
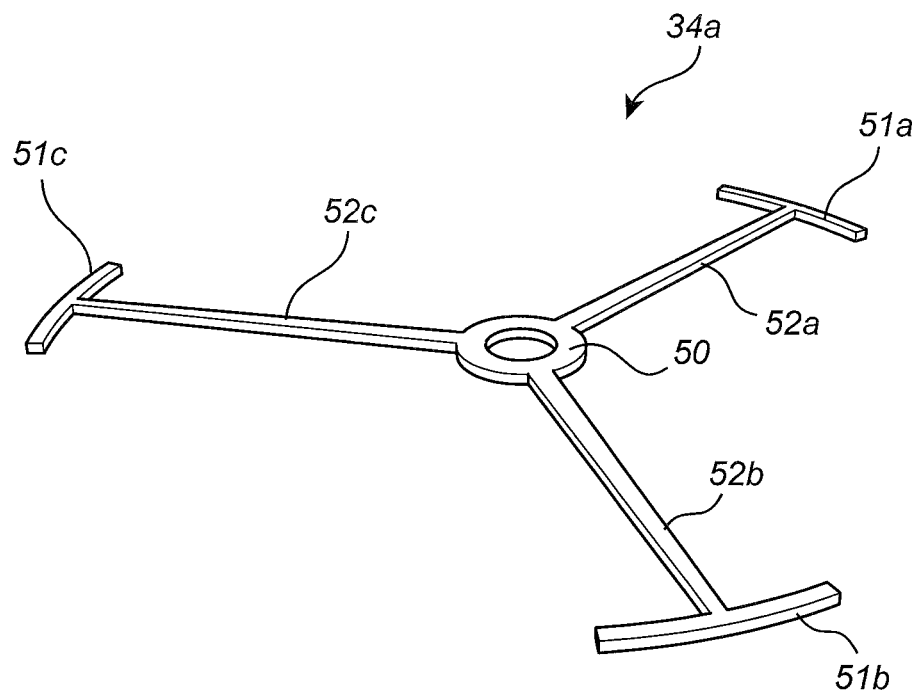
FIGS. 8a-b are perspective views of example reflector plates comprised in the reflector arrangement of the radar level gauge system in FIG. 5.

Referring first to FIG. 8a, the reflector plate 34a comprises an annular central portion 50, three peripheral portions 51a-c and three arms 52a-c connecting the central portion 50 with the respective peripheral portions 51a-c.

When the reflector plate 34a is installed in the still pipe 33 as shown in FIG. 5, spaces will be defined by the central portion 50, the arms 52a-c, the peripheral portions 51a-c and the inner wall of the still pipe 33. Through these spaces, filling level measurement through hand dipping will be enabled.

Figure 8B:
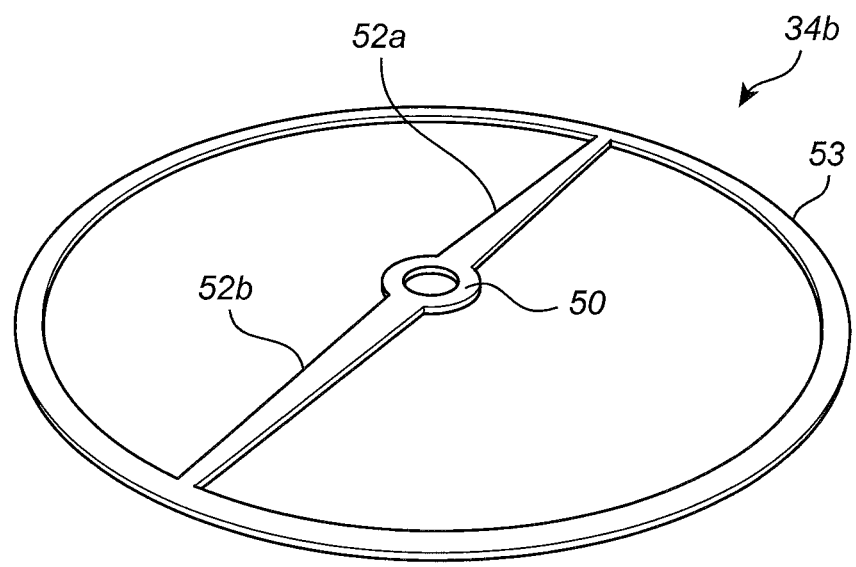

Turning now to FIG. 8b, the second exemplary reflector plate 35b shown therein differs from that described above with reference to FIG. 8a in that the peripheral portion 53 is ring-shaped.

A filling level measuring system 1 comprising a radar level gauge system 60 according to a third embodiment of the present invention will now be described with reference to FIG. 9. The filling level measuring system 1 shown in FIG. 9 differs from those described above with reference to FIG. 1 and FIG. 4 in that the radar level gauge 60 in FIG. 9 is a radar level gauge of GWR (Guided Wave Radar) type mounted at the top of a "process tank".

Figure 9:
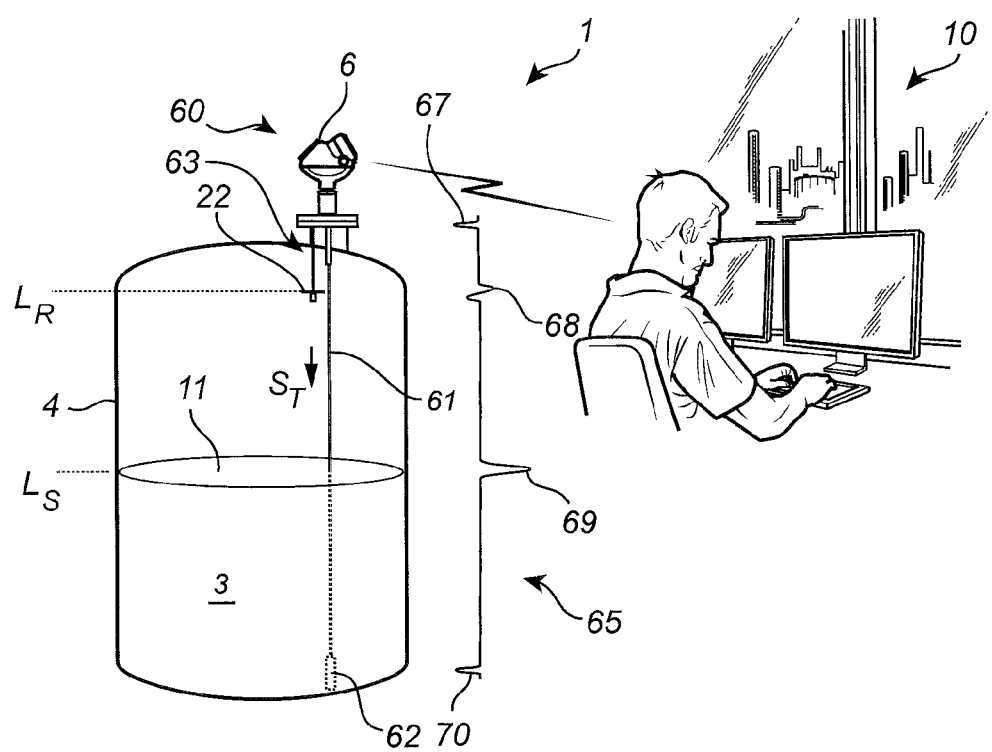
FIG. 9 schematically shows a filling level measuring system comprising a radar level gauge system according to a third embodiment of the present invention, and a host system.

As is indicated in FIG. 9, the radar level gauge system 60 comprises a signal propagation arrangement in the form of a transmission line probe 61 extending from the measuring unit 6 towards and into the product 3. In the example embodiment in FIG. 9, the transmission line probe 61 is a single lead wire probe, that has a weight 62 attached at the end thereof to keep the wire probe straight and vertical. In a similar fashion as has previously been described with reference to FIG. 1 and FIG. 4, the GWR-type radar level gauge system 60 in FIG. 9 further comprises a reflector arrangement 63 arranged adjacent to the transmission line probe 61 in such a way that the reflector plate 22 is at least partly within the propagation pattern of the transmission line probe 61.

When the radar level gauge 60 is in operation, it transmits an electromagnetic transmit signal $S_T$ towards the surface 11 of the product 3. The electromagnetic transmit signal $S_T$ is guided by the transmission line probe 61, and when the transmit signal $S_T$ encounters an impedance transition, a portion of the power of the transmit signal is reflected back towards the measurement unit 6 of the radar level gauge 60 as an echo having a time-of-flight corresponding to the distance from the measuring unit 6 to the impedance transition (and back).

The echoes from the different impedance transitions encountered by the transmit signal $S_T$ may be used (together with the transmit signal $S_T$) to form an echo curve 65. The echo curve 65 in FIG. 9 includes, from top to bottom, a fiducial echo 67 corresponding to the impedance transition at the connection between the transceiver and the transmission line probe, a reference reflector echo 68 resulting from reflection at the reflector plate 22, a surface echo 69 resulting from reflection at the surface 11 of the product 3, and an end-of-probe echo 70 resulting from reflection at the end of the transmission line probe 61.

By identifying and analyzing the different echoes in the echo curve 65, for example, the reference reflector level $L_R$ and the filling level $L_S$ can be determined.

Figure 10:
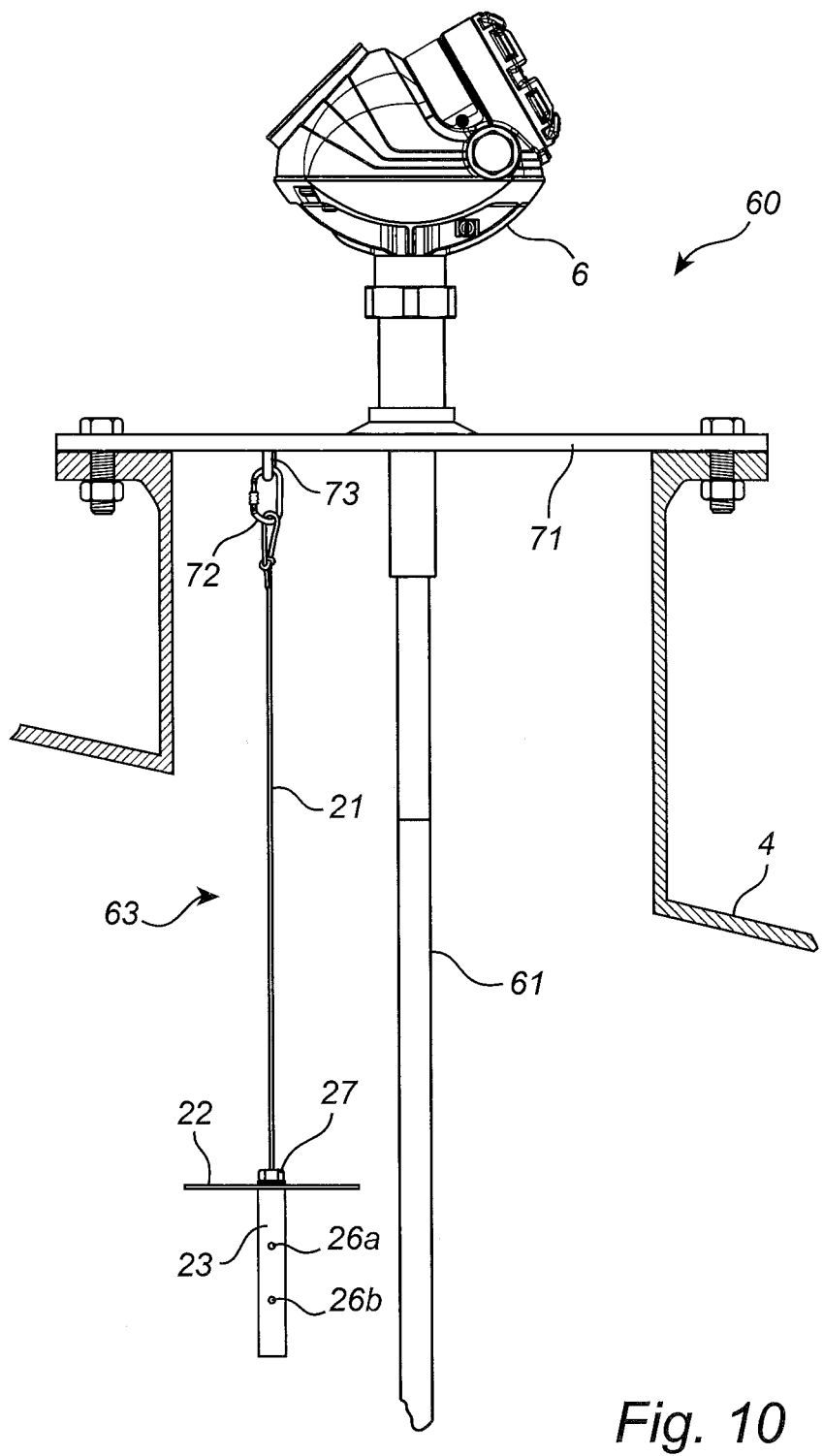
FIG. 10 is an enlarged view of the radar level gauge system in FIG. 9.

As can be seen in FIG. 10, the radar level gauge 60 comprises a flange 71 for mounting of the radar level gauge 60 at the tank 4. In the presently illustrated example, the attachment location for the reflector arrangement 63 is provided in the form of a metal loop 73 fixed to the flange 71. For attaching the wire 21 to the loop 73, a carabiner 72 is provided at the end of the wire 21 as is schematically indicated in FIG. 10.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A radar level gauge system for determining a filling level of a product in a tank, said radar level gauge system comprising:
   a transceiver for generating, transmitting and receiving electromagnetic signals;
   a signal propagation arrangement connected to said transceiver and arranged to propagate an electromagnetic transmit signal from said transceiver towards said product in the tank, and to return to said transceiver an electromagnetic surface reflection signal resulting from reflection of said electromagnetic transmit signal at a surface of said product;
   a reflector arrangement comprising:
      a pliable elongated member attached at an attachment location within said tank;
      a reflector member arranged along said pliable elongated member and spaced apart from said attachment location; and
      a weight coupled to said reflector member in such a way that an orientation of said weight determines an orientation of said reflector member,
   wherein said reflector member is arranged to reflect said electromagnetic transmit signal back towards the transceiver as an electromagnetic reflector signal; and
   processing circuitry coupled to said transceiver and configured to determine a proof test level based on said transmit signal and said reflector signal.

2. The radar level gauge system according to claim 1, wherein said weight and said reflector member are connected to each other using at least one releasable fastener.

3. The radar level gauge system according to claim 1, wherein said reflector member is arranged between said weight and said attachment location.

4. The radar level gauge system according to claim 3, wherein said weight has an upper surface, and said reflector member has a lower surface,
   the lower surface of said reflector member resting on the upper surface of said weight.

5. The radar level gauge system according to claim 1, wherein:
   said reflector member exhibits a maximum reflector member extension in a plane perpendicular to a direction of extension of said pliable elongated member; and
   said weight extends along said pliable elongated member along a distance being greater than one half of said maximum reflector member extension.

6. The radar level gauge system according to claim 1, wherein said weight has an internal surface enclosing said pliable elongated member.

7. The radar level gauge system according to claim 6, wherein said reflector arrangement further comprises at least one weight fastener arranged for pressing said pliable elongated member against said internal surface of the weight.

8. The radar level gauge system according to claim 1, wherein said pliable elongated member is attached to said signal propagation arrangement.

9. The radar level gauge system according to claim 8, wherein said attachment location is located at a periphery of said signal propagation arrangement.

10. The radar level gauge system according to claim 8, wherein said reflector arrangement further comprises a clamping member clamped to said signal propagation arrangement.

11. The radar level gauge system according to claim 10, wherein said signal propagation arrangement comprises a radiation directing member having a periphery,
said clamping member of the reflector arrangement extending around said periphery of the radiation directing member.

12. The radar level gauge system according to claim 11, wherein said radiation directing member is an antenna reflector,
said clamping member extending along a rim of said antenna reflector.

13. The radar level gauge system according to claim 11, wherein said radiation directing member is an antenna horn,
said clamping member extending along a rim of said antenna horn.

14. The radar level gauge system according to claim 1, wherein said reflector member is perforated reflector plate.

15. The radar level gauge system according to claim 1, wherein said reflector member is substantially disc-shaped.

16. The radar level gauge system according to claim 1, wherein:
said signal propagation arrangement comprises a pipe extending vertically in the tank, and an antenna arranged at a top opening of the pipe; and
said pliable elongated member is attached to the pipe.

17. The radar level gauge system according to claim 16, wherein said reflector arrangement is arranged inside said pipe.

18. The radar level gauge system according to claim 17, wherein said reflector arrangement comprises a clamping member inserted in the pipe through the top opening.

19. The radar level gauge system according to claim 18, wherein said clamping member has an adjustable diameter.

20. The radar level gauge system according to claim 18, wherein said clamping member comprises a radially extending portion for resting on a top end surface of said pipe.

21. The radar level gauge system according to claim 18, wherein:
said reflector arrangement further comprises an attachment member attached to said pliable elongated member, a diameter of said attachment member being greater than a diameter of said pliable elongated member; and
said clamping member comprises a receiving member for interacting with the attachment member to attach the remainder of the reflector arrangement to the clamping member.

22. The radar level gauge system according to claim 1, wherein said reflector member comprises a central portion, a peripheral portion and at least two arms connecting the central portion and the peripheral portion.

23. The radar level gauge system according to claim 1, wherein said pliable elongated member is a wire.

24. The radar level gauge system according to claim 23, wherein said wire is a metal wire comprising a plurality of filaments.

25. The radar level gauge system according to claim 1, wherein said weight is made of a non-sparking material.

26. The radar level gauge system according to claim 1, wherein said processing circuitry is further configured to determine the filling level in the tank based on the transmit signal and the surface reflection signal.

27. The radar level gauge system according to claim 1, wherein said processing circuitry is further configured to provide a proof test signal.

28. The radar level gauge system according to claim 1, wherein said radar level gauge is controllable between a filling level measuring state and a proof test state, and
wherein, in said proof test state, said processing circuitry is configured to:
determine a proof test level based on said reflector signal; and
provide said proof test level to allow determination of a proof test result based on said proof test level.

29. A reflector arrangement for proof test of a radar level gauge, said reflector arrangement comprising:
a pliable elongated member for attachment to a fixed structure in said tank;
a weight attachable to said pliable elongated member; and
a reflector member for reflecting an electromagnetic signal impinging on said reflector member,
wherein said weight is configured to be coupled to said reflector member in such a way that an orientation of said weight determines an orientation of said reflector member.

30. The reflector arrangement according to claim 29, further comprising a releasable fastener for connecting said reflector member to said weight.

31. The reflector arrangement according to claim 29, wherein:
said reflector member exhibits a maximum reflector member extension; and
said weight is configured to extend along said pliable elongated member along a distance being greater than one half of said maximum reflector member extension.

32. The reflector arrangement according to claim 29, further comprising:
a clamping member having a wire attachment member for attachment of said wire to said clamping member.

33. The reflector arrangement according to claim 32, wherein said clamping member is configured to clamp against an outer periphery of an antenna comprised in a radar level gauge system.

34. The reflector arrangement according to claim 32, wherein said clamping member is configured to clamp against an inner surface of a pipe comprised in a radar level gauge system.

35. The reflector arrangement according to claim 34, wherein:
said reflector arrangement further comprises an attachment member attached to said pliable elongated member, a diameter of said attachment member being greater than a diameter of said pliable elongated member; and
said clamping member comprises a receiving member for interacting with the attachment member to attach the reflector arrangement to the clamping member.

36. The reflector arrangement according to claim 29, wherein said reflector member is a perforated disc.

37. The reflector arrangement according to claim 29, comprising a plurality of reflector members with different maximum extensions.

38. The reflector arrangement according to claim 29, wherein said reflector member comprises a central portion, a peripheral portion and at least two arms connecting the central portion and the peripheral portion.

39. A method of installing a reference reflector for testing a radar level gauge arranged at a tank, said method comprising the steps of:
 providing a reflector arrangement comprising:
  a pliable elongated member;
  a reflector member; and
  a weight coupled to the reflector member in such a way that an orientation of said weight determines an orientation of said reflector member;
 attaching the pliable elongated member at an attachment location within the tank; and
 lowering said reflector member and said weight into said tank through an opening in a roof of said tank.

40. A method of testing a radar level gauge arranged at a tank containing a product, said method comprising the steps of:
 providing a reflector arrangement comprising:
  a pliable elongated member;
  a reflector member; and
  a weight coupled to the reflector member in such a way that an orientation of said weight determines an orientation of said reflector member;
 attaching the pliable elongated member at an attachment location within the tank;
 arranging said reflector member at a known proof test level;
 transmitting an electromagnetic transmit signal towards a surface of said product;
 receiving an electromagnetic reflector signal resulting from reflection of said electromagnetic transmit signal at said reflector member; and
 determining a proof test level based on said transmit signal and said reflector signal.

* * * * *